United States Patent
Graf et al.

[11] Patent Number: 6,148,256
[45] Date of Patent: *Nov. 14, 2000

[54] CONTROL FOR A MOTOR VEHICLE WITH AN AUTOMOTIVE TRANSMISSION AND A SMART GEAR CHANGE UNIT

[75] Inventors: Friedrich Graf, Regensburg; Joachim Schäfer, Rain; Kai Storjohann, Regensburg; Michael Ulm, Dahlienweg, all of Germany

[73] Assignee: Siemens Aktiengesellschaft, Munich, Germany

[ * ] Notice: This patent is subject to a terminal disclaimer.

[21] Appl. No.: 08/605,467

[22] Filed: Feb. 26, 1996

Related U.S. Application Data

[63] Continuation of application No. PCT/EP94/02808, Aug. 25, 1994.

[30] Foreign Application Priority Data

Aug. 26, 1993 [DE] Germany ............................. 93113672

[51] Int. Cl.⁷ ...................................................... G06F 7/00
[52] U.S. Cl. ................................ 701/53; 701/51; 701/54; 701/55; 477/107; 477/109
[58] Field of Search ............................ 364/424.1, 424.01, 364/150, 151, 424.04, 424.05, 431.04, 431.08; 477/129, 131, 155, 65, 121, 128, 125, 109, 33, 98, 151, 152, 163, 903, 34, 110; 180/271, 335; 395/900, 905; 701/51, 52, 53, 54, 55, 56

[56] References Cited

U.S. PATENT DOCUMENTS

| | | | |
|---|---|---|---|
| 4,703,428 | 10/1987 | Hosaka et al. | 364/424.1 |
| 4,945,481 | 7/1990 | Iwatsuki et al. | 364/424.1 |
| 5,012,695 | 5/1991 | Kyohzuka et al. | 74/859 |
| 5,091,856 | 2/1992 | Hasegawa et al. | 364/424.05 |
| 5,228,368 | 7/1993 | Kato et al. | 364/424.1 |
| 5,307,270 | 4/1994 | Graf | 364/424.1 |
| 5,323,667 | 6/1994 | Tweed et al. | 364/424.083 |
| 5,335,568 | 8/1994 | Kammerl et al. | 364/424.1 |
| 5,369,581 | 11/1994 | Ohsuga et al. | 364/424.1 |
| 5,369,584 | 11/1994 | Kajnara | 364/424.083 |
| 5,390,117 | 2/1995 | Graf et al. | 364/424.1 |
| 5,396,420 | 3/1995 | Graf | 364/424.1 |
| 5,436,834 | 7/1995 | Graf et al. | 364/424.1 |
| 5,547,434 | 8/1996 | Graf et al. | 477/109 |
| 6,026,342 | 2/2000 | Graf et al. | 701/51 |

FOREIGN PATENT DOCUMENTS

| | | |
|---|---|---|
| 0 425 199 | 5/1991 | European Pat. Off. . |
| 0 532 363 | 3/1992 | European Pat. Off. . |
| 0 388 107 | 11/1992 | European Pat. Off. . |
| 0 554 465 | 8/1993 | European Pat. Off. . |
| 0 622 570 | 11/1994 | European Pat. Off. . |
| 40 21 251 | 6/1991 | Germany . |

*Primary Examiner*—Jacques H. Louis-Jacques
*Attorney, Agent, or Firm*—Herbert L. Lerner; Laurence A. Greenberg; Werner H. Stemer

[57] ABSTRACT

A control for a motor vehicle includes a transmission control and an engine control which are connected to one another through a communication channel. Functional units of the transmission control which are dependent on data of an engine and of a chassis of the motor vehicle, so-called engine-specific and chassis-specific functional units, are integrated into the engine control. Functional units having a function which is dependent on data of the transmission, so-called transmission-specific components, are contained in a computer-controlled gear shifting configuration. Data which are necessary for controlling the transmission are exchanged between the engine control and the gear shifting configuration through the communication channel 6. A shift point selection control, which can be constructed as a fuzzy control, is contained in the engine control.

10 Claims, 2 Drawing Sheets

CONTROL FOR A MOTOR VEHICLE WITH AN AUTOMOTIVE TRANSMISSION AND A SMART GEAR CHANGE UNIT

CROSS-REFERENCE TO RELATED APPLICATION

This application is a Continuation of International Application Ser. No. PCT/EP94/02808, filed Aug. 25, 1994.

BACKGROUND OF THE INVENTION

Field of the Invention

The invention relates to a control for a motor vehicle with an automatic transmission, wherein the control includes a transmission control and an engine control which are connected to one another by a communication channel. Such controls are available in different constructions.

In a known integrated control for the automatic transmission and the engine of a motor vehicle, the transmission is controlled by an independent control unit which is controlled separately from the engine control (U.S. Pat. No. 4,945,481).

A transmission control essentially has to carry out the following functions:

a shift transition control which ensures a soft and wear-free engagement of the individual gears;

a control of the converter lockup clutch;

a shift logic which determines the respective gear to be engaged;

self-diagnosis; and basic functions such as, for example, input and output functions.

Since the shift transition control has to be of a transmission-specific configuration but the configuration of the shift logic depends, inter alia, on data of the engine and the chassis of the motor vehicle, the result is a large number of different variants of the control for the various types of motor vehicle. Furthermore, the outlay for a cable harness between the transmission control and the various valves and sensors in the transmission is extremely high.

SUMMARY OF THE INVENTION

It is accordingly an object of the invention to provide a control for a motor vehicle, which overcomes the hereinafore-mentioned disadvantages of the heretofore-known devices of this general type and which reduces the number of required variants of the control.

With the foregoing and other objects in view there is provided, in accordance with the invention, in a motor vehicle having an engine, an automatic transmission and a chassis, a control comprising a transmission control, an engine control and a communication channel interconnecting the transmission control and the engine control; a shift point selection control being dependent on data of the engine and of the chassis and being integrated into the engine control; a computer-controlled gear shifting configuration of the transmission containing parts of the control being dependent on data of the transmission; and the communication channel exchanging data being necessary for controlling the transmission between the engine control and the gear shifting configuration.

In accordance with another feature of the invention, the engine control contains circuit devices for classifying driving characteristics of a driver and for evaluating a route travelled by the motor vehicle and carrying out a dynamic shift point correction.

In accordance with a further feature of the invention, the engine control transfers data relating to an actual engine torque, a desired transmission ratio, a desired slip of a convertor lockup clutch and a reduction of the actual engine torque to the gear shifting configuration.

In accordance with an added feature of the invention, the gear shifting configuration transfers data relating to an acceptance of a desired transmission ratio, an actual transmission ratio, an actual slip of a converter lock-up clutch and a desired torque reduction to the engine control.

In accordance with an additional feature of the invention, the gear shifting configuration transfers data relating to faults and restrictions in functioning of the gear shifting configuration, relating to a transmission temperature, relating to a convertor boosting and relating to a gearshift lever position to the engine control.

In accordance with yet another feature of the invention, parameters of the motor vehicle and of the transmission are exchanged between the engine control and the gear shifting configuration through the communication channel when an ignition is switched on.

In accordance with yet a further feature of the invention, the engine control transfers the following parameters of the motor vehicle to the gear shifting configuration: reduced mass moment of inertia at a transmission power output, mass of the motor vehicle and wheel size.

In accordance with yet an added feature of the invention, the gear shifting configuration transfers the following parameters of the transmission to the engine control: number of transmission gears, transmission ratios of the transmission gears, data of a torque converter and shift types.

In accordance with a concomitant feature of the invention, the shift point selection control contains a fuzzy logic control.

The advantages of the invention lie in particular in the fact that the outlay for the cabling and the communication in the motor vehicle is significantly reduced. The chassis-specific and engine-specific functions of the transmission control are contained in the engine control while the purely transmission-specific functions are contained in a computer-controlled gear shifting configuration. The latter constitutes an "intelligent" actuator which is completely tested at the manufacturer of the transmission. This results in a significant logistical advantage.

Other features which are considered as characteristic for the invention are set forth in the appended claims.

Although the invention is illustrated and described herein as embodied in a control for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
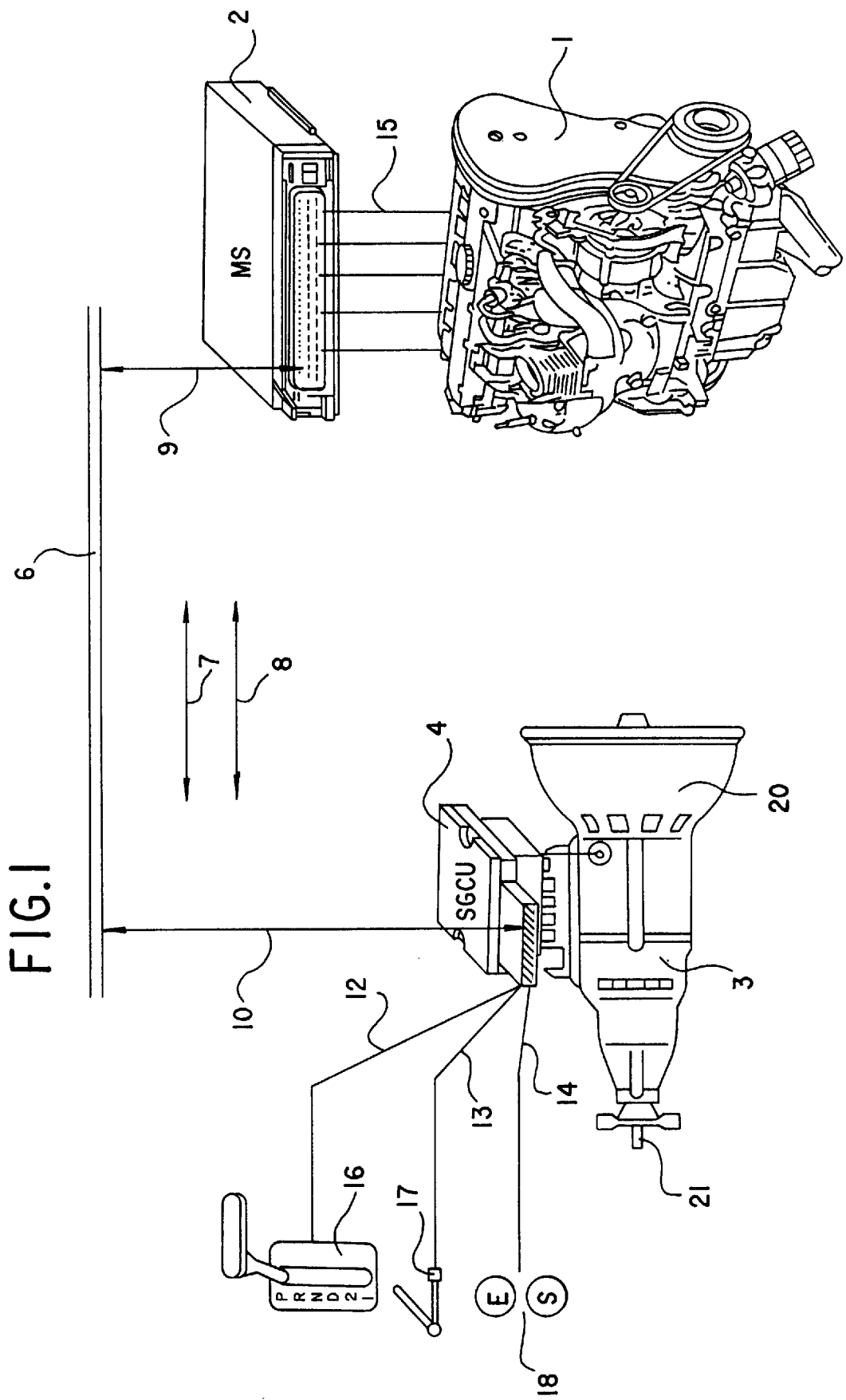
FIG. 1 is a diagrammatic, perspective view of essential components of a motor vehicle drive and a schematic circuit diagram of a control which is provided according to the invention.

Referring now to the figures of the drawing in detail and first, particularly, to FIG. 1 thereof, there is seen an engine 1 which is controlled by an engine control 2 and a transmission or gearbox 3 which is controlled by a gear shifting configuration 4. The engine control 2 and the gear shifting configuration 4 are connected through the use of a communication channel 6 which is constructed, for example, as a CAN bus. This bus is only schematically illustrated herein, since it is generally known and described in many publications.

On one hand, data which serve for gear selection and are indicated by an arrow 7 are exchanged between the engine control 2 and the gear shifting configuration 4 and on the other hand, configuration parameters which serve for performing an adaptation to the respective motor vehicle and which are indicated by an arrow 8, are exchanged. Examples of the data transmitted through the communication channel 6 are specified further below.

The bidirectional connection of the engine control 2 to the communication channel 6 is schematically indicated by a line 9 and the bidirectional connection of the gear shifting configuration 4 to the communication channel 6 is indicated by a line 10.

A gear shift lever 16, a kickdown switch 17 and a driving program selection switch 18 are connected to the gear shifting configuration 4 through the use of signal lines 12, 13 and 14. The driver enters his or her instructions or wishes into the gear shifting configuration 4 through the use of the following control elements: settings P, R, N, D, 2 and 1 being selected through the use of the gear shift lever 16, a request for strong acceleration being selected through the use of the kickdown switch 17 and a choice between an "economy" and a "sport" driving program being selected through the use of the driving program selection switch 18.

The engine 1 is connected to the engine control 2 through the use of control and signal lines 15. Sensor signals relating to the engine speed, the engine temperature and other known operating parameters are transmitted from the engine 1 to the engine control 2 and instructions for controlling the ignition, the fuel injection quantity, the ignition time and, if appropriate, other known engine parameters, are transferred from the engine control 2 to the engine 1.

The engine 1 and the transmission 3 are illustrated separately herein for the sake of better clarity. However, it is generally known that a power output shaft of the engine 1 is connected directly to a torque convertor 20 of the transmission 3. Correspondingly, a power output shaft 21 is also connected to a power output train of the motor vehicle. The chassis, the wheel suspensions, the wheels and further components of the motor vehicle are not illustrated herein since they are not affected by the invention and are generally known.

Figure 2:
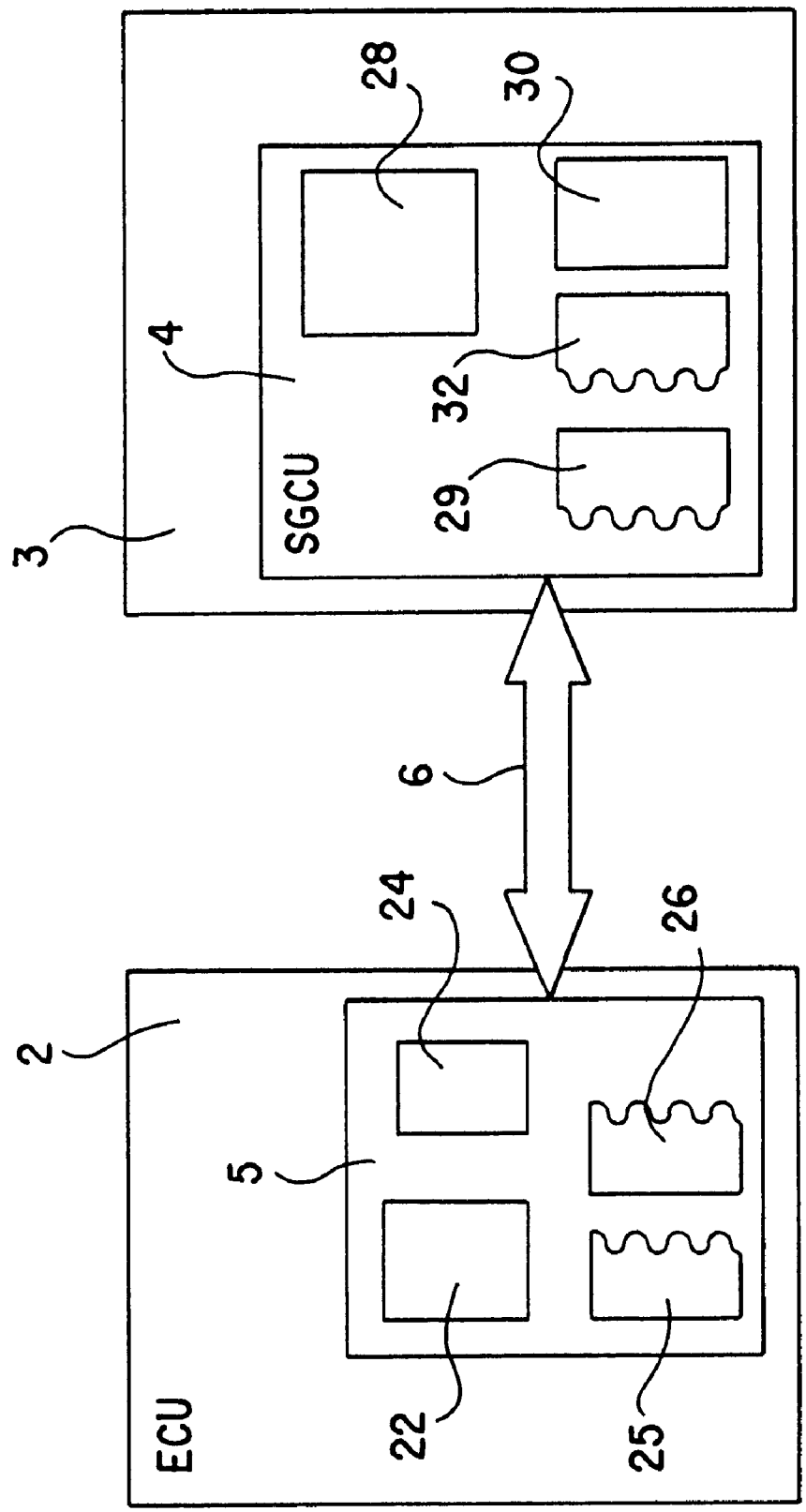
FIG. 2 is a block diagram showing a control of the drive according to FIG. 1.

Some of the functional units of a transmission control which are chassis-specific or engine-specific, i.e. which depend on the data of the engine and of the chassis of the motor vehicle, are integrated in this case and are combined under reference numeral 5 into the engine control 2 as shown in FIG. 2. These functional units include: a shift logic or shift point selection control 22, a driver or driving characteristics classification 24, a diagnostic circuit 25 and basic modules 26 which, for example, carry out data input and output procedures. The shift logic 22 can be constructed as a fuzzy control and in this case can also contain the functions of driver or driving characteristics classification, route evaluation and dynamic shift point correction (see Published European Patent Application 0 622 570 A1).

The computer-controlled gear shifting configuration 4, which is also referred to as SGCU (Smart Gear Change Unit), contains essentially only functional units which are dependent on the data of the transmission. These are a shift sequence control 28, a diagnostic circuit 29 for actuators, a control 30 of a convertor lockup clutch or TCC (Torque Convertor Clutch) and basic modules 32 which, for example, process signals of known sensors that are near to the transmission, for example signals of engine speed sensors in the transmission, of temperature sensors and of hydraulic pressure sensors in the transmission, etc..

The gear shifting configuration 4 is constructed in such a way that only minimum chassis-dependent and engine-dependent parameterization of its functions is necessary, i.e. only a very small amount of data on the chassis and the engine of the respective motor vehicle have to be contained. By dividing up the functions between the engine control and the gear shifting configuration, the outlay for cabling between the engine control, the gear shifting configurations and the sensors and actuators, which are not illustrated herein since they are generally known and are not changed by the invention, is very much reduced.

The gear shifting configuration 4 is directly attached to the housing of the transmission 3 or accommodated in this housing. It is supplied by the manufacturer together with the transmission as one unit.

State variables Z and control variables S are exchanged between the engine control (EC) 2 and the gear shifting configuration (SGCU) 4 through the communication channel. An example of the data to be exchanged is illustrated in the following table. In the table below, CC signifies the convertor lockup clutch of the transmission.

| EC to SGCU | Type | SGCU to EC | Type |
|---|---|---|---|
| $E_{eng,act}$ (actual engine torque) | Z | | Z |
| $T_{des}$ (desired transmission ratio) | S | $T_{des}$, o.k. (acceptance of desired transmission ratio) | Z |
| | | $T_{act}$ (actual transmission ratio) | Z |
| CC $slip_{des}$ (desired CC slip) | S | CC $slip_{act}$ (actual CC slip) | Z |
| | | Fault status of the SGCU | Z |
| | | Malfunction of the SGCU | Z |
| | | Restriction of functions of the SGCU | Z |
| $E_{red,act}$ (actual torque reduction) | Z | $E_{red,des}$ (desired torque reduction) | S |
| | | Gearbox temperature | Z |
| | | Converter booster | Z |
| | | Gear shift lever position | Z |

In addition to such an exchange of data, parameters which are necessary for controlling the gear changing process can also be exchanged between the engine control 2 and the gear shifting configuration 4 through the communication channel 6. These parameters are expediently transmitted as physical units. An example of the parameters to be transmitted is illustrated in the following table.

| EC to SGCU | SGCU to EC |
|---|---|
| Mass moment of inertia | Number of gears |
| Mass of vehicle | Transmission ratios |
| Wheel size | Shift types |

The term shift types in this case refers to the gear changes which are acceptable depending on the respective transmission. Thus, for example, down-shifting from fifth into first or second and to a certain extent also into third gear, is not permitted in many transmissions.

This results in the following advantages: only a minimum of engine-specific and chassis-specific data are required by the gear shifting configuration 4. The latter is completely independent of the data of the engine and the chassis. Only a minimum of transmission-specific data is required in the engine control 2. The result of this is that the gear shifting configuration does not have to be adapted to different varieties of engine and chassis during manufacture. The microprocessor or computer (which is not illustrated herein since it is generally known) contained in the gear shifting configuration ensures that adaptation is carried out through the use of transmitted engine and chassis parameters. Another possibility is to store data sets for the various varieties of vehicle in the gear shifting configuration 4 and to activate the respective data set of one of these varieties through the use of a code word which is transmitted to the gear shifting configuration 4 through the communication channel 6.

In addition to the transference of physical parameters, state variables and control variables, identification information can also be exchanged between the engine control and the gear shifting configuration. This permits the following:

If components are replaced, for example within the scope of repairs, there is a provision for the components to exchange identification data through the communication channel 6 which are variety-specific, i.e. which identify the type of motor vehicle for which the respective component is suitable. Thus, the other components or control units are capable of detecting whether or not they are capable of operating with one another. In this way it is possible to detect whether or not, for example, a transmission which is unsuitable for the motor vehicle has been inadvertently installed.

Through the use of this exchange of control unit-specific identification data, it is also possible to prohibit an unauthorized exchange of components or units. As a result, a repair by unauthorized workshops and in particular an installation of stolen units into a motor vehicle or of replacement components in a stolen motor vehicle, are effectively prevented. Thus, an improved protection against theft is also provided.

We claim:

1. In a motor vehicle having an engine, an automatic transmission and a chassis, a control comprising:
    a transmission control, an engine control separate from said transmission control, and a communication channel interconnecting said transmission control and said engine control;
    said engine control having a shift point selection control integrated therein which is dependent on data of the engine and of the chassis, and said engine control containing circuit devices for classifying driving characteristics of a driver;
    said transmission control including a computer-controlled gear shifting configuration being dependent on data of the transmission; and
    said communication channel exchanging data being necessary for controlling the transmission between said engine control and said gear shifting configuration.

2. The control according to claim 1, wherein said engine control contains circuit devices for evaluating a route travelled by the motor vehicle and carrying out a dynamic shift point correction.

3. The control according to claim 1, wherein said engine control transfers data relating to an actual engine torque, a desired transmission ratio, a desired slip of a convertor lockup clutch and a reduction of the actual engine torque to said gear shifting configuration.

4. The control according to claim 1, wherein said gear shifting configuration transfers data relating to an acceptance of a desired transmission ratio, an actual transmission ratio, an actual slip of a converter lock-up clutch and a desired torque reduction to said engine control.

5. The control according to claim 1, wherein parameters of the motor vehicle and of the transmission are exchanged between said engine control and said gear shifting configuration through said communication channel when an ignition is switched on.

6. The control according to claim 5, wherein said engine control transfers the following parameters of the motor vehicle to said gear shifting configuration: reduced mass moment of inertia at a transmission power output, mass of the motor vehicle and wheel size.

7. The control according to claim 5, wherein said gear shifting configuration transfers the following parameters of the transmission to said engine control: number of transmission gears, transmission ratios of the transmission gears, data of a torque converter and shift types.

8. The control according to claim 1, wherein said shift point selection control contains a fuzzy logic control.

9. In a motor vehicle having an engine, an automatic transmission and a chassis, a control comprising:
    a transmission control, an engine control separate from said transmission control, and a communication channel interconnecting said transmission control and said engine control;
    a shift point selection control dependent on data of the engine and of the chassis;
    said transmission control including a computer-controlled gear shifting configuration being dependent on data of the transmission; and
    said communication channel exchanging data being necessary for controlling the transmission between said engine control and said gear shifting configuration, wherein said gear shifting configuration transfers data relating to faults and restrictions in functioning of said gear shifting configuration, relating to a transmission temperature, relating to a convertor boosting and relating to a gearshift lever position to said engine control.

10. In a motor vehicle having an engine, an automatic transmission and a chassis, a control comprising:
    a transmission control, an engine control separate from said transmission control, and a communication channel interconnecting said transmission control and said engine control;
    said engine control including a shift point selection control for controlling shift points of the automatic transmission and a driving characteristics classification for setting the shift point selection control to given characteristics of a driver, said shift point selection control being dependent on data of the engine and of the chassis;
    said transmission control including a computer-controlled gear shifting configuration being dependent on data of the transmission; and
    said engine control and said gear shifting configuration exchanging data through said communication channel which are necessary for controlling the transmission.

* * * * *